US012777519B2

(12) United States Patent
Otani et al.

(10) Patent No.: US 12,777,519 B2
(45) Date of Patent: Oct. 27, 2026

(54) WIRELESS APPARATUS AND WIRELESS COMMUNICATION METHOD FOR ADAPTIVE THRESHOLD DETERMINATION IN CARRIER SENSING BASED ON FRAME PRIORITY AND BSS IDENTIFICATION

(71) Applicant: NTT, Inc., Tokyo (JP)

(72) Inventors: Hanae Otani, Musashino (JP); Akira Kishida, Musashino (JP); Kengo Nagata, Musashino (JP); Yusuke Asai, Musashino (JP); Yasuhiko Inoue, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 483 days.

(21) Appl. No.: 18/276,449

(22) PCT Filed: Feb. 18, 2021

(86) PCT No.: PCT/JP2021/006142
§ 371 (c)(1),
(2) Date: Aug. 9, 2023

(87) PCT Pub. No.: WO2022/176110
PCT Pub. Date: Aug. 25, 2022

(65) Prior Publication Data
US 2024/0098783 A1 Mar. 21, 2024

(51) Int. Cl.
*H04W 74/0808* (2024.01)

(52) U.S. Cl.
CPC ................................ *H04W 74/0808* (2013.01)

(58) Field of Classification Search
None
See application file for complete search history.

(56) References Cited

U.S. PATENT DOCUMENTS

| | | | | |
|---|---|---|---|---|
| 11,438,925 | B2 * | 9/2022 | Lv | H04B 17/318 |
| 2015/0358904 | A1 * | 12/2015 | Kwon | H04W 74/0808 370/252 |
| 2018/0020396 | A1 * | 1/2018 | Yoshimura | H04W 72/04 |
| 2018/0110073 | A1 * | 4/2018 | Mestanov | H04W 40/12 |
| 2019/0082467 | A1 * | 3/2019 | Nunome | H04W 74/08 |
| 2020/0045637 | A1 * | 2/2020 | Noh | H04W 52/0229 |

(Continued)

OTHER PUBLICATIONS

IEEE, "Part 11: Wireless LAN Medium Access Control (MAC) and Physical Layer (PHY) Specifications", IEEE P802.11ax™/D8.0, Oct. 2020, 15 pages.

(Continued)

*Primary Examiner* — Marcus Smith
*Assistant Examiner* — Rowan K Fakhro
(74) *Attorney, Agent, or Firm* — XSENSUS LLP

(57) ABSTRACT

A wireless apparatus according to one aspect of the present invention includes a reception unit configured to receive, on a frequency channel, a frame including first identification information for identifying the priority level of the frame, and a carrier sensing control unit configured to determine a threshold based on the first identification information, and determine a usage state of the frequency channel based on a comparison between received power of the frame and the determined threshold.

4 Claims, 10 Drawing Sheets

(56) References Cited

U.S. PATENT DOCUMENTS

2021/0315036 A1* 10/2021 Jang .................... H04W 76/15

OTHER PUBLICATIONS

Shinohara et al., "System Capacity Improvement by CCA Threshold Control and Transmit Power Control with High Efficiency Wireless LAN", the Institute of Electronics, Information and Communication Engineers, IEICE Technical Report, RCS2016-208( ), Dec. 2016, 7 pages including English Translation.

English translation of International Preliminary Report On Patentability (Chapter I) mailed on Aug. 31, 2023, In corresponding PCT/JP2021/006142, 6 pages.

* cited by examiner

WIRELESS APPARATUS AND WIRELESS COMMUNICATION METHOD FOR ADAPTIVE THRESHOLD DETERMINATION IN CARRIER SENSING BASED ON FRAME PRIORITY AND BSS IDENTIFICATION

CROSS-REFERENCE TO RELATED APPLICATION

The present application is based on PCT filing PCT/JP2021/006142, filed Feb. 18, 2021, the entire contents of which are incorporated herein by reference.

TECHNICAL FIELD

The present invention relates to wireless communication.

BACKGROUND ART

With the spread of portable wireless terminals such as notebook computers and smartphones, wireless local area networks (LANs) compliant with the IEEE 802.11 standard are widely used not only in companies and public spaces but also in general households these days. This has brought about a situation in which multiple basic service sets (BSSs) using the same frequency channel exist adjacent to one another. In such a situation, there is a possibility that the reliability of wireless communication will drop due to a decrease in throughput or an increase in transmission delay.

CITATION LIST

Non Patent Literature

Non Patent Literature 1: IEEE P802.11ax/D8.0, "26.10 Spatial reuse operation", October 2020.

SUMMARY OF INVENTION

Technical Problem

The present invention aims to provide a technology that enables highly-reliable wireless communication.

Solution to Problem

A wireless apparatus according to an aspect of the present invention includes a reception unit configured to receive, on a frequency channel, a frame including first identification information for identifying the priority level of the frame, and a carrier sensing control unit configured to determine a threshold based on the first identification information, and determine a usage state of the frequency channel based on a comparison between received power of the frame and the determined threshold.

Advantageous Effects of Invention

According to the present invention, there is provided a technology that enables highly-reliable wireless communication.

DESCRIPTION OF EMBODIMENTS

Hereinafter, embodiments of the present invention will be described with reference to the drawings.

[Configuration]

Figure 1:
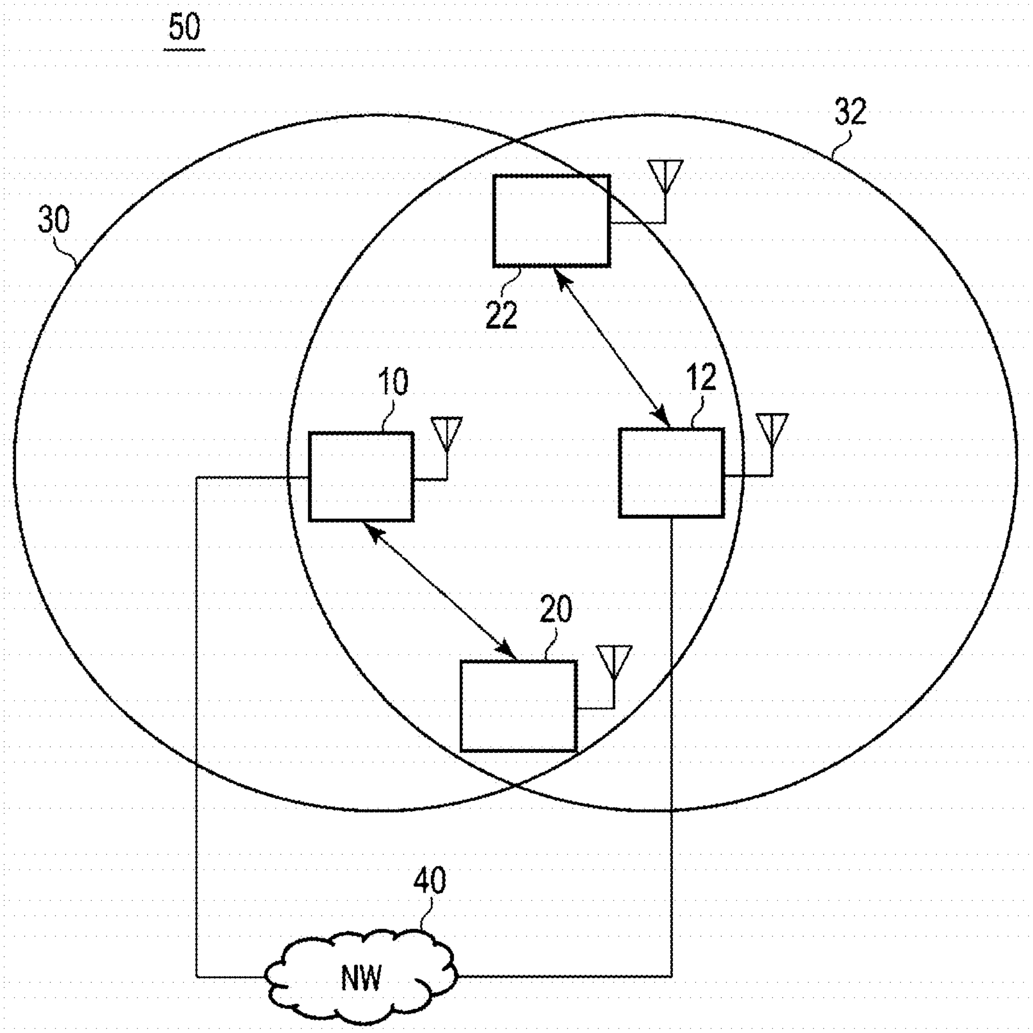
FIG. 1 is a diagram illustrating a communication system according to an embodiment of the present invention.

FIG. 1 schematically illustrates a communication system 50 according to an embodiment of the present invention. As illustrated in FIG. 1, the communication system 50 includes base stations 10 and 12, terminals 20 and 22, and a network 40.

The base stations 10 and 12 operate as access points (APs) of a wireless local area network (LAN). The base station 10 communicates wirelessly with the terminal 20, and the base station 12 communicates wirelessly with the terminal 22. Communication between the base stations 10 and 12 and the terminals 20 and 22 is based on the IEEE 802.11 standard, for example. The base stations 10 and 12 are connected to the network 40 by cables, for example. The network 40 may include a local area network (LAN), a wide area network (WAN), or both. Note that the base stations 10 and 12 may be connected to different networks.

The terminals 20 and 22 are wireless terminals. Examples of the wireless terminals include smartphones, tablet personal computers (PCs), desktop PCs, and laptop PCs. The terminals 20 and 22 exchange data with a computer (a server, for example) (not illustrated in the drawing) in the network 40 via the base stations 10 and 12.

In the communication system 50, two basic service sets (BSSs) 30 and 32 exist adjacent to each other, the BSS 30 includes the base station 10 and the terminal 20, and the BSS 32 includes the base station 12 and the terminal 22. The BSSs 30 and 32 use the same frequency channel. Hereinafter, the frequency channel will be simply referred to as the channel.

In the description below, wireless stations will be used as the term that mean base stations and wireless terminals. For example, a wireless station may refer to each of the base stations 10 and 12 and the terminals 20 and 22, or any of these, depending on the context.

A wireless station performs carrier sensing before frame transmission to determine the usage status of the channel to be used for the frame transmission. The carrier sensing may be based on a CSMA/CA (Carrier Sense Multiple Access with Collision Avoidance) algorithm. In CSMA/CA, a threshold called a clear channel assessment (CCA) threshold is used to determine a channel usage state. In a case where a frame is detected by the carrier sensing, the wireless station determines a CCA threshold based on information included in the preamble of the detected frame, and determines whether the channel is busy or idle based on a comparison between the received power value of the detected frame and the determined CCA threshold. After confirming that the channel is idle, the wireless station transmits a frame.

In the IEEE 802.11ax standard, the BSS color is defined. The BSS color is an identifier related to the BSS, and is included in the preamble of the frame. Based on the BSS color included in the preamble of the detected frame, the wireless station can determine whether the destination of the detected frame is a wireless station in its own BSS, or whether the destination is a wireless station in another BSS. In a case where the destination of the detected frame is a wireless station in another BSS, the wireless station increases the CCA threshold. Specifically, in a case where the destination of the detected frame is a wireless station in its own BSS, the wireless station uses a CCA threshold of −82 dBm. In a case where the destination of the detected frame is a wireless station in another BSS, the wireless station uses a CCA threshold of −72 dBm. The IEEE 802.11ax standard copes with the exposed node problem by determining the CCA threshold based on whether the destination of the frame is a wireless station in its own BSS, or whether the destination is a wireless station in another BSS.

In FIG. 1, the base stations 10 and 12, and the terminals 20 and 22 are located so that the base station 12 can detect a signal from the base station 10 with a power value within the range from −82 dBm to −72 dBm, and the terminal 20 can detect a signal from the base station 12. According to the IEEE 802.11ax standard, in a case where the base station 10 is transmitting a frame to the terminal 20, the base station 12 uses the CCA threshold of −72 dBm for a signal from the base station 10 detected by carrier sensing. Therefore, there is a possibility that the base station 12 will determine that the channel is idle, and perform frame transmission to the terminal 22. In a case where the base station 12 performs frame transmission to the terminal 22, a frame from the base station 10 to the terminal 20 is subject to an interference by a frame from the base station 12 to the terminal 22. Due to this interference, the terminal 20 might fail to receive a frame from the base station 10.

For example, real-time applications (RTAs) such as cloud games and industrial robot control applications require low latencies in communications. The interference described above degrades communication latencies between wireless stations. Hereinafter, a frame including data with a high priority level such as data requiring low latencies will be also referred to as a high-priority frame, and a frame including data with a low priority level will be also referred to as a low-priority frame.

In an embodiment of the present invention, in a case where a detected frame is a high-priority frame related to another BSS, the wireless station uses a lower CCA threshold than that in a case where a detected frame is a low-priority frame related to another BSS. With this arrangement, in a case where a detected frame is a high-priority frame related to another BSS, it is difficult to determine that the channel is idle, and events in which the high-priority frame is interfered are reduced. Thus, it is possible to achieve a low latency required for a high-priority frame, while avoiding or alleviating the exposed node problem. That is, even in a situation where there is an overlap in a plurality of BSSs, highly-reliable wireless communication can be performed.

In the communication system 50, wireless communication between a base station and a terminal is compliant with the IEEE 802.11 standard. In the IEEE 802.11 standard, the first layer and the MAC sublayer of the second layer of the open systems interconnection (OSI) reference model are specified. In the OSI reference model, a communication function is divided into seven layers (the first layer: a physical layer, the second layer: a data link layer, the third layer: a network layer, the fourth layer: a transport layer, the fifth layer: a session layer, the sixth layer: a presentation layer, the seventh layer: an application layer).

The data link layer includes a logical link control (LLC) layer and a media access control (MAC) layer, for example. The LLC layer attaches a destination service access point (DSAP) header, a source service access point (SSAP) header, and the like to data input from a higher-level layer, for example, to generate an LLC packet. The MAC layer attaches a MAC header to the LLC packet, for example, to generate a MAC frame. The MAC frame is also called a MAC protocol data unit (MPDU). The physical layer attaches a preamble and the like to the MAC frame, for example, to generate a wireless frame. The wireless frame is also called a physical layer (PHY) protocol data unit (PPDU).

Figure 2:
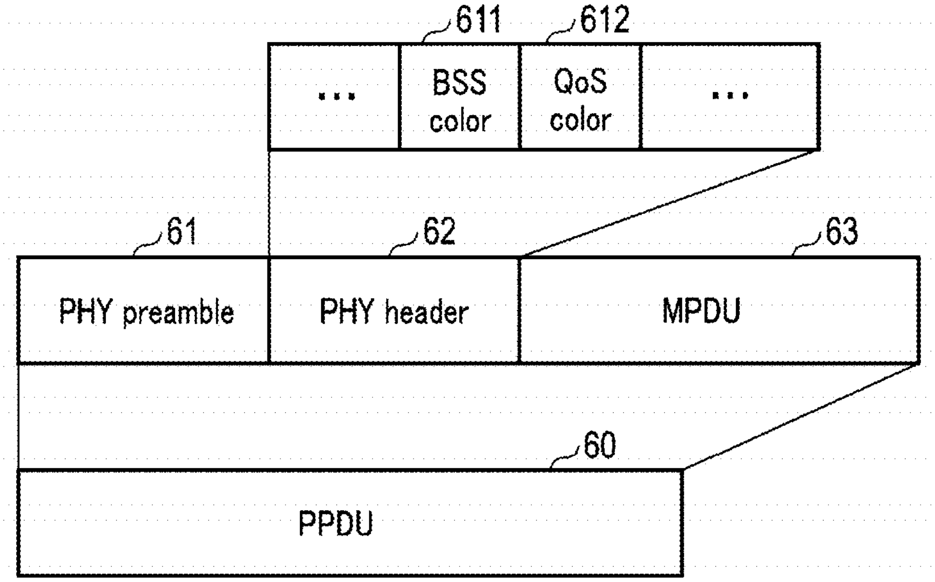
FIG. 2 is a diagram illustrating a frame format according to an embodiment of the present invention.

FIG. 2 schematically illustrates an example structure of a wireless frame 60 according to an embodiment. As illustrated in FIG. 2, the wireless frame 60 includes a PHY preamble 61, a PHY header 62, and an MPDU 63. The PHY preamble 61 and the PHY header 62 are collectively referred to as the preamble.

The PHY preamble 61 includes a field for storing information to be used for synchronization. The PHY header 62 includes fields for storing control information. Specifically, the PHY header 62 includes a field for storing the information necessary for data demodulation, a field 611 for storing identification information for identifying the BSS, a field 612 for storing identification information for identifying the priority level of the frame, and the like. The identification information for identifying the BSS may be, but is not limited to, the BSS color specified in IEEE 802.11ax.

In the high-efficiency (HE) frame format defined in IEEE 802.11ax, the preamble includes an L-STF, an L-LTF, an L-SIG, an HE-SIG-A, an HE-STF, an HE-LTF, and the like. The HE-SIG-A includes a field for storing the BSS color. The L-STF, the L-LTF, the HE-STF, and the HE-LTF correspond to the synchronization information, and the L-SIG and the HE-SIG-A correspond to the control information.

Hereinafter, the identification information for identifying the BSS is the BSS color, and the identification information for identifying the priority level of the frame will be referred to as the Quality of Service (QoS) color. The frame priority is expressed in two or more stages. In a case where the frame priority is expressed in two stages, the field 612 may have the length of one bit. For example, in a case where the frame priority is high, "0" is stored in the field 612, and, in a case where the frame priority is low, "1" is stored in the field 612. In a case where the frame priority is expressed in four stages, the field 612 may have the length of two bits. For example, "00" is associated with the highest frame priority, "01" is associated with the second highest frame priority, "10" is associated with the third highest frame priority, and "11" is associated with the lowest frame priority.

Note that the field 612 may be included in the field 611. In this case, the identification information for identifying the BSS and the identification information for identifying the priority level of the frame are indicated by information included in the field 611. The field 611 or the field 612 may be included in the PHY preamble 61, instead of the PHY header 62.

Next, the configurations of the base station 10 and the terminal 20 are described. The base station 12 may have the same configuration as the base station 10, and the terminal 22 may have the same configuration as the terminal 20. Therefore, explanation of the configurations of the base station 12 and the terminal 22 is not made herein.

Figure 3:
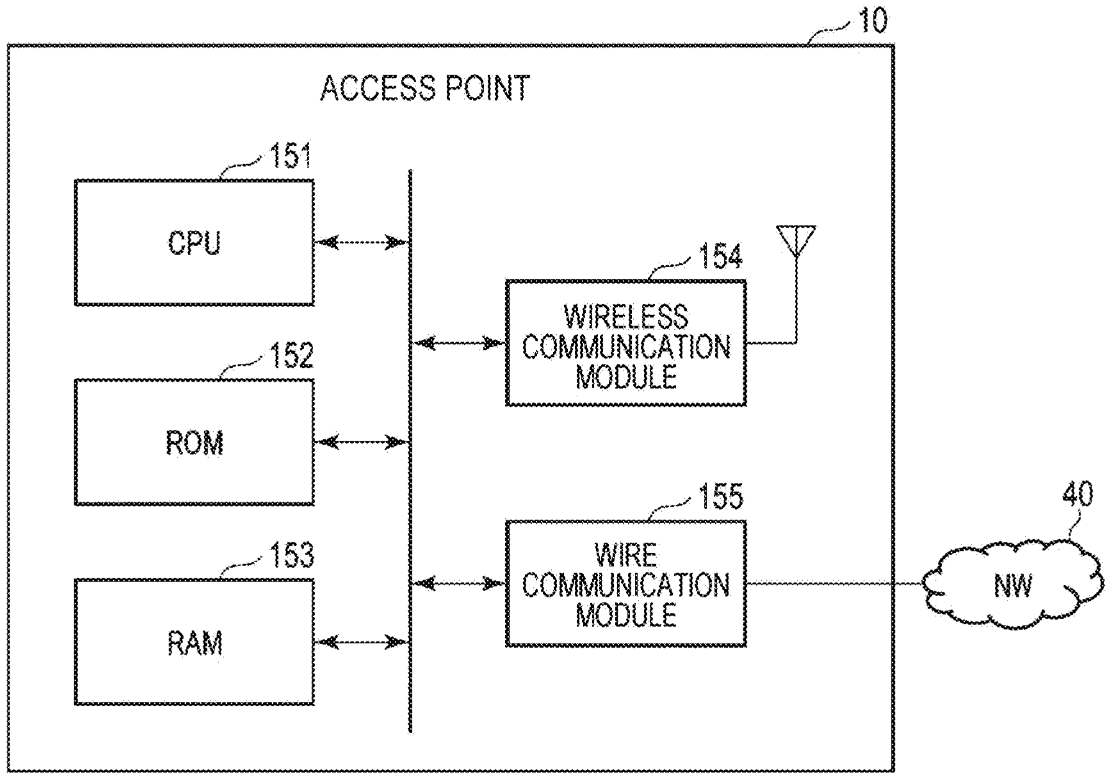
FIG. 3 is a block diagram illustrating the hardware configuration of the base station illustrated in FIG. 1.

FIG. 3 schematically illustrates an example hardware configuration of the base station 10. In the example illustrated in FIG. 3, the base station 10 includes a central processing unit (CPU) 151, a read-only memory (ROM) 152, a random access memory (RAM) 153, a wireless communication module 154, and a wire communication module 155.

The CPU 151 is a circuit capable of executing various programs, and controls the entire operation of the base station 10. The ROM 152 is a nonvolatile semiconductor memory, and holds programs, control data, and the like for controlling the base station 10. The RAM 153 is a volatile semiconductor memory, for example, and is used as a working area of the CPU 151. The wireless communication module 154 is a circuit that is used to transmit/receive data with a wireless signal. The wireless communication module 154 includes a digital circuit, an analog circuit, an A/D converter, and a D/A converter, for example. The digital circuit includes a general-purpose processor such as a CPU. Alternatively or in addition to that, the digital circuit may include a dedicated processor such as an application specific integrated circuit (ASIC) or a field programmable gate array (FPGA). The analog circuit includes a frequency up-converter, a frequency down-converter, a modulation circuit, a demodulation circuit, and the like, for example. The wireless communication module 154 is connected to an antenna. The wireless communication module 154 may include an antenna. The wire communication module 155 is a circuit that is used to transmit/receive data with a wire signal, and is connected to the network 40.

Figure 4:
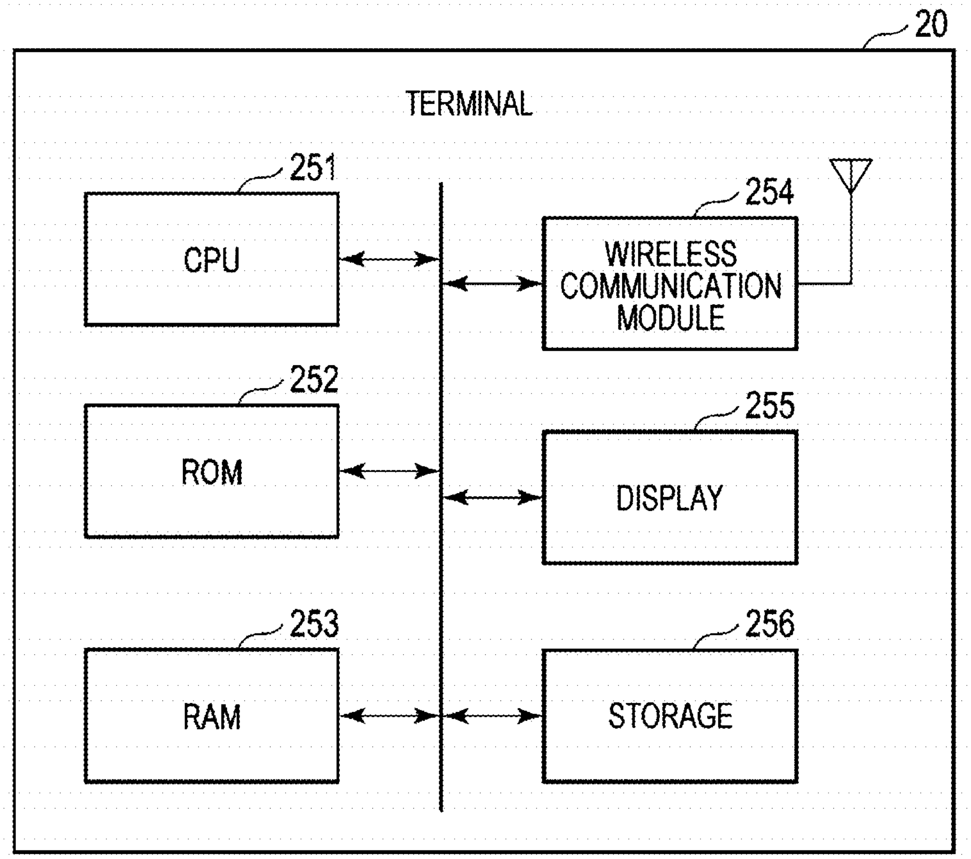
FIG. 4 is a block diagram illustrating the hardware configuration of the terminal illustrated in FIG. 1.

FIG. 4 schematically illustrates an example hardware configuration of the terminal 20. In the example illustrated in FIG. 4, the terminal 20 includes a CPU 251, a ROM 252, a RAM 253, a wireless communication module 254, a display 255, and a storage 256. The CPU 251 is a circuit capable of executing various programs, and controls the entire operation of the terminal 20. The ROM 252 is a nonvolatile semiconductor memory, and holds programs, control data, and the like for controlling the terminal 20. The RAM 253 is a volatile semiconductor memory, for example, and is used as a working area of the CPU 251. The wireless communication module 254 is a circuit that is used to transmit/receive data with a wireless signal, and is connected to an antenna. The wireless communication module 254 may include an antenna. The display 255 displays information about a graphical user interface (GUI) compatible with application software or the like, for example. The storage 256 is a nonvolatile storage device, and holds system software and the like of the terminal 20, for example.

The terminal 20 may further include an input interface. For example, the terminal 20 may include a touch-screen.

Figure 5:
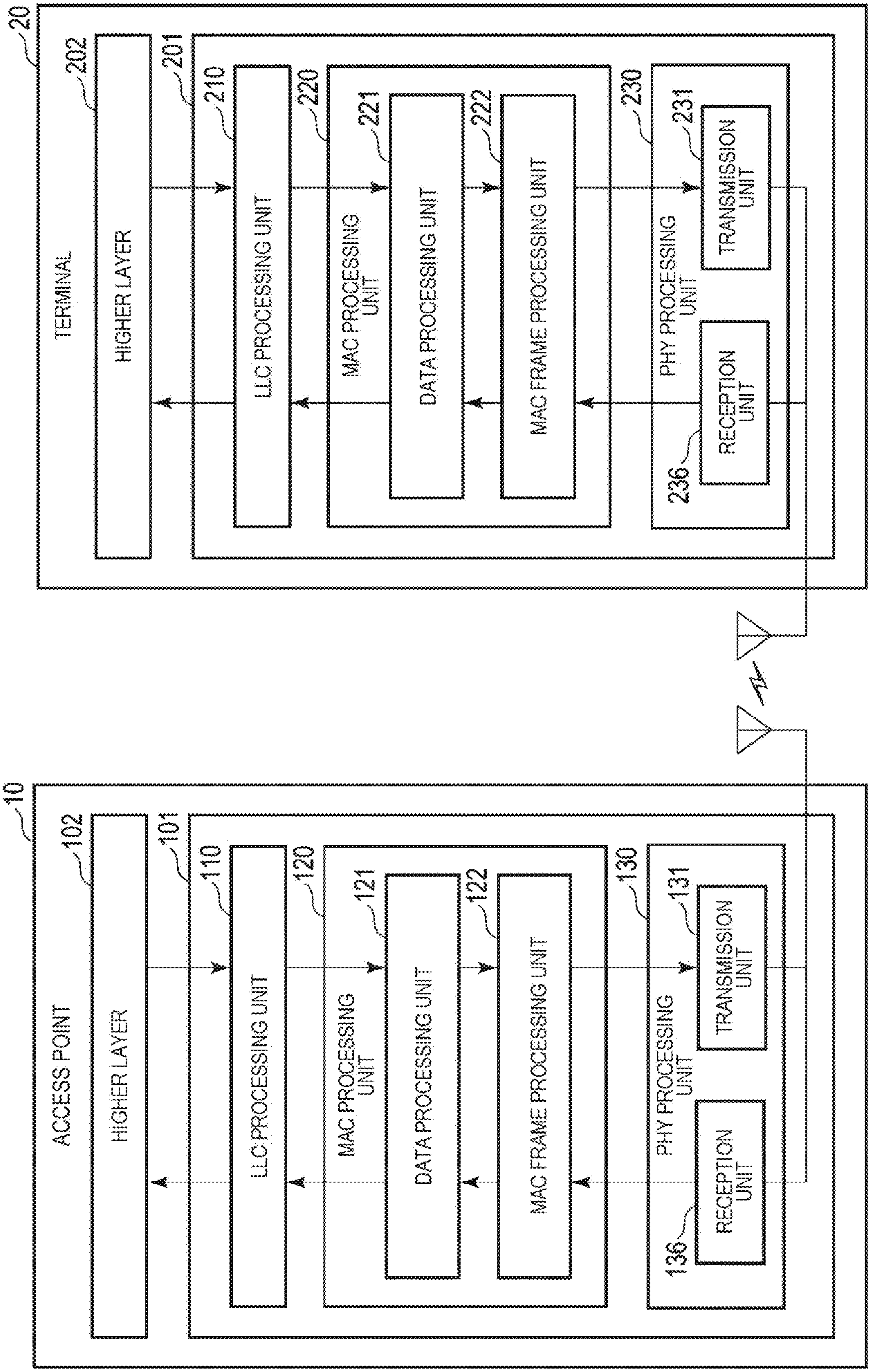
FIG. 5 is a block diagram illustrating the functional configurations of the base station and the terminal illustrated in FIG. 1.

FIG. 5 schematically illustrates example functional configurations of the base station 10 and the terminal 20. A wireless station (each of the base station 10 and the terminal 20) subjects data input from a higher layer to processing in the LLC layer, processing in the MAC layer, and processing in the PHY layer, to generate a wireless signal including the data, and transmit the wireless signal. The wireless station also receives a wireless signal, extracts data from the received wireless signal by subjecting the received wireless signal to processing in the PHY layer, processing in the MAC layer, and processing in the LLC layer, and outputs the extracted data to the higher layer. The higher layer is an application layer, for example.

In the example illustrated in FIG. 5, the base station 10 includes a wireless unit 101 and a higher layer 102. The wireless unit 101 includes an LLC processing unit 110, a MAC processing unit 120, and a PHY processing unit 130. The wireless unit 101 is implemented with the wireless communication module 154, or a combination of the CPU 151 and the wireless communication module 154, for example.

The LLC processing unit 110 serves as an interface with the higher layer 102, and performs processing in the LLC layer. For example, in a case where data addressed to the terminal 20 is input from the network 40 to the base station 10, the LLC processing unit 110 receives the data from the higher layer 102, adds a DSAP header, an SSAP header, and the like to the data, and thus, generates an LLC packet. The LLC processing unit 110 receives the traffic identifier (TID) of the data from the higher layer 102, together with the data. The TID is information indicating the priority level of the data. For example, data that requires a low latency is assigned a high priority level. The LLC processing unit 110 sends the LLC packet and the TID to the MAC processing unit 120. Also, when receiving an LLC packet from the MAC processing unit 120, the LLC processing unit 110 extracts data from the LLC packet, and sends the extracted data to the higher layer 102.

The MAC processing unit 120 performs processing in the MAC layer. In the example illustrated in FIG. 5, the MAC processing unit 120 includes a data processing unit 121 and a MAC frame processing unit 122. The MAC frame processing unit 122 is also called a carrier sensing control unit.

When receiving an LLC packet and a TID from the LLC processing unit 110, the data processing unit 121 generates a MAC frame by attaching a MAC header including the transmission destination address, the transmission source address, BSS information indicating the BSS, the TID, and the like, and an error detection code to the LLC packet. The data processing unit 121 transmits the MAC frame to MAC frame processing unit 122. Further, when receiving a MAC frame from the PHY processing unit 130 via the MAC frame processing unit 122, the data processing unit 121 demodulates the MAC frame, to obtain a MAC header and an LLC packet. The data processing unit 121 determines whether the transmission destination address included in the MAC header indicates its own station (specifically, the base station 10). In a case where the transmission destination address indicates its own station, the data processing unit 121 sends the LLC packet to the LLC processing unit 110. In a case where the transmission destination address does not indicate its own station, the data processing unit 121 discards the LLC packet.

The MAC frame processing unit 122 receives a MAC frame from the data processing unit 121, and temporarily stores the MAC frame. The MAC frame processing unit 122 then performs carrier sensing over a random time, and sends the MAC frame to the PHY processing unit 130 after confirming that the channel is idle. The MAC frame processing unit 122 determines that the channel is busy when the received power observed in the PHY processing unit 130 is higher than the CCA threshold, and determines that the channel is idle when the received power is not higher than the CCA threshold. The received signal strength indicator (RSSI) as the received power is measured by the PHY processing unit 130, and is supplied to the MAC frame processing unit 122. The MAC frame processing unit 122 determines the CCA threshold in accordance with a combination of the value of the BSS color and the value of the QoS color included in the preamble of the wireless frame detected by the carrier sensing. The method for determining the CCA threshold will be described later.

The PHY processing unit 130 performs processing in the PHY layer. In the example illustrated in FIG. 5, the PHY processing unit 130 includes a transmission unit 131 and a reception unit 136.

When receiving a MAC frame from the MAC processing unit 120, the transmission unit 131 generates a wireless frame by attaching a preamble and the like to the MAC frame. The preamble includes a BSS color and a QoS color. The transmission unit 131 converts the wireless frame into a wireless signal, and transmits the wireless signal via the antenna.

The reception unit 136 receives a wireless signal via the antenna, and converts the received wireless signal into a wireless frame. The reception unit 136 first obtains the BSS color and the QoS color included in the preamble of the wireless frame, and sends them to the MAC processing unit 120. The reception unit 136 then extracts the MAC frame from the wireless frame, and sends the MAC frame to the MAC processing unit 120.

Figure 6:
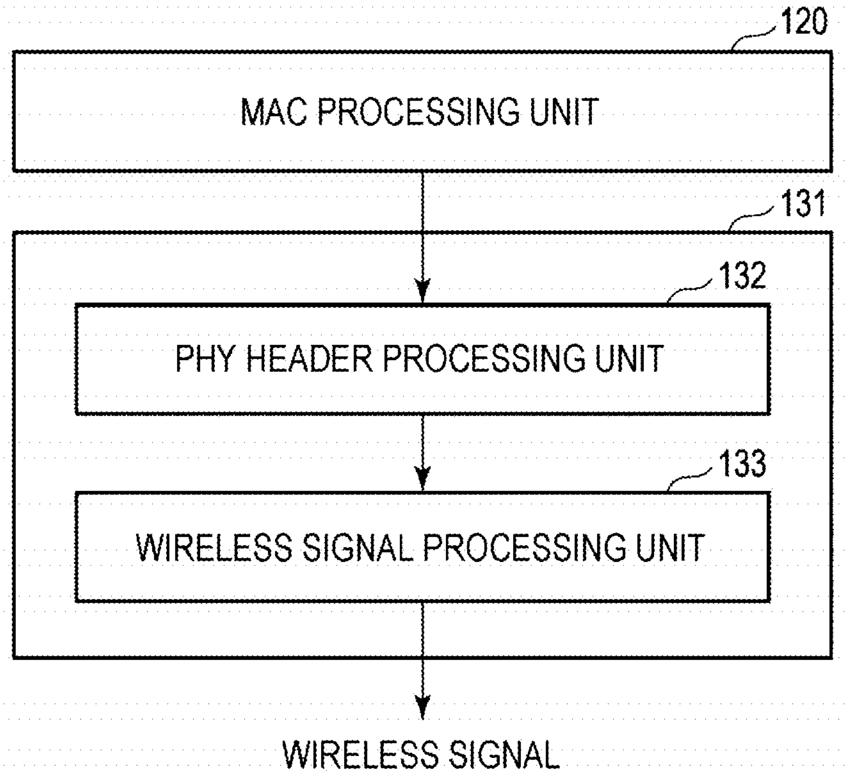
FIG. 6 is a block diagram illustrating the transmission unit illustrated in FIG. 5.

FIG. 6 schematically illustrates an example configuration of the transmission unit 131. As illustrated in FIG. 6, the transmission unit 131 includes a PHY header processing unit 132 and a wireless signal processing unit 133.

As described above, the MAC processing unit 120 sends a MAC frame to the transmission unit 131 after confirming that the channel is idle. That is, the MAC processing unit 120 sends a MAC frame to the transmission unit 131 after acquiring a transmission right.

The PHY header processing unit 132 receives the MAC frame from the MAC processing unit 120. The PHY header processing unit 132 generates a wireless frame by attaching a PHY header including information such as a BSS color and a QoS color, and a PHY preamble to the MAC frame. The PHY header processing unit 132 determines the value of the BSS color based on the BSS information included in the MAC header, and determines the value of the QoS color based on the TID information included in the MAC header. Note that the QoS color may be determined based on information other than the TID information, such as association identifier (AID) information, for example. When the value of the QoS color is determined based on the AID information, a priority level can be set for each terminal. For example, all the frames to be transmitted by a terminal to which a specific AID is assigned by the base station 10 are set to a high priority level.

The higher the priority level of data is, the higher the frame priority level is set. The TID is expressed in two or more stages. For example, the TID may be expressed by two values #1 and #2, and the priority levels of data may descend in the order of #1 and #2. In this case, the transmission unit 131 may set the QoS color to a value ("0", for example) indicating that the frame priority level is high in a case where the TID is #1, and may set the QoS color to a value ("1", for example) indicating that the frame priority level is low in a case where the TID is #2 Also, the TID may be expressed by three values #1, #2, and #3, and the priority levels of data may descend in the order of #1, #2, and #3. In this case, the transmission unit 131 may set the QoS color to a value ("0", for example) indicating that the frame priority level is high in a case where the TID is #1, and may set the QoS color to a value ("1", for example) indicating that the frame priority level is low in a case where the TID is #2 or #3. These are merely examples of the method for determining the QoS color.

The wireless signal processing unit 133 receives a wireless frame from the PHY header processing unit 132, performs a predetermined modulating operation on the wireless frame to convert the wireless frame into a wireless signal, and transmits the wireless signal via the antenna. The predetermined modulating operation may include convolutional coding, interleaving, subcarrier modulation, inverse fast Fourier transform (IFFT), orthogonal frequency division multiplexing (OFDM) modulation, and frequency transform, for example.

Figure 7:
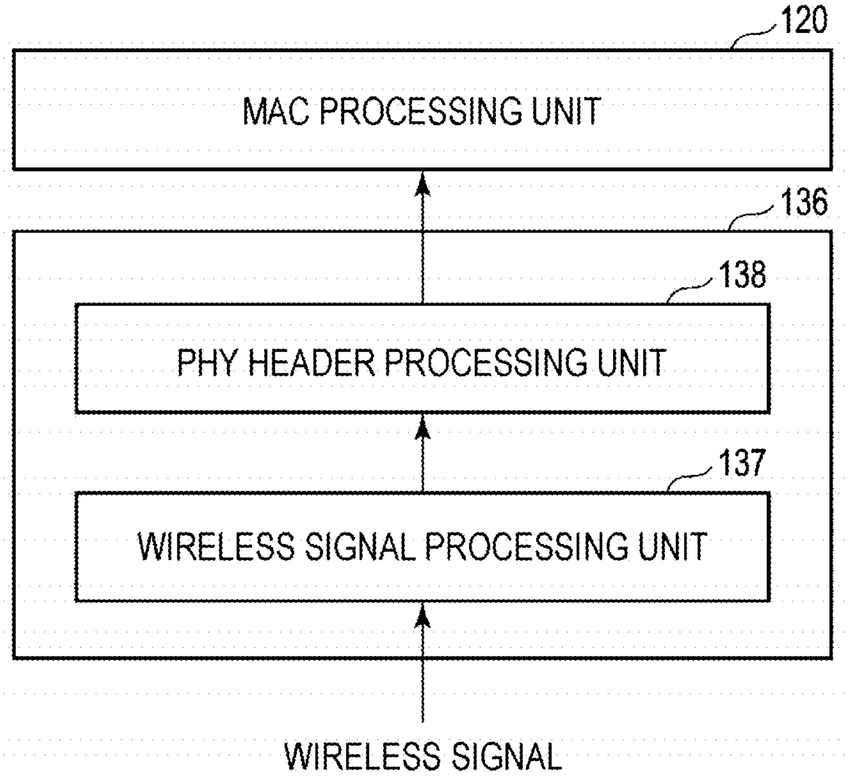
FIG. 7 is a block diagram illustrating the reception unit illustrated in FIG. 5.

FIG. 7 schematically illustrates an example configuration of the reception unit 136. As illustrated in FIG. 7, the reception unit 136 includes a wireless signal processing unit 137 and a PHY header processing unit 138.

The wireless signal processing unit 137 performs a predetermined demodulating operation on a wireless signal received by the antenna, and sends the resultant wireless frame to the PHY header processing unit 138. The predetermined demodulating operation may include frequency transform, OFDM demodulation, fast Fourier transform (FFT), subcarrier demodulation, deinterleaving, and Viterbi decoding, for example.

Further, the wireless signal processing unit 137 measures the RSSI of the received wireless signal. The wireless signal processing unit 137 notifies the MAC processing unit 120 of the RSSI via the PHY header processing unit 138.

The PHY header processing unit 138 receives the wireless frame from the wireless signal processing unit 137, and identifies information included in the preamble (specifically, the PHY header) of the wireless frame, such as the BSS color and the QoS color, for example. The PHY header processing unit 138 performs the operation described below, based on the BSS color and the QoS color included in the preamble.

At the time of frame reception, in a case where the BSS color indicates its own BSS (specifically, the BSS to which the base station 10 belongs), the PHY header processing unit 138 causes the wireless signal processing unit 137 to continue the demodulating operation, sends the BSS color and QoS color extracted from the preamble of the wireless frame to the MAC processing unit 120, and then sends the MAC frame extracted from the wireless frame to the MAC processing unit 120. In a case where the BSS color does not indicate its own BSS, the PHY header processing unit 138 stops the demodulating operation of the wireless signal processing unit 137. Even in a case where the demodulating operation is stopped, the PHY header processing unit 138 sends the BSS color and the QoS color to the MAC processing unit 120.

At the time of carrier sensing, the PHY header processing unit 138 notifies the MAC processing unit 120 of the values of the BSS color and QoS color extracted from the preamble of the wireless frame.

Referring back to FIG. 5, the terminal 20 includes a wireless unit 201 and a higher layer 202. The wireless unit 201 includes an LLC processing unit 210, a MAC processing unit 220, and a PHY processing unit 230. The wireless unit 201 is implemented with the wireless communication module 254, or a combination of the CPU 251 and the wireless communication module 254, for example.

The LLC processing unit 210, the MAC processing unit 220, and the PHY processing unit 230 perform operations similar to those of the LLC processing unit 110, the MAC processing unit 120, and the PHY processing unit 130, respectively. Therefore, detailed explanation of the LLC processing unit 210, the MAC processing unit 220, and the PHY processing unit 230 is not made herein.

The LLC processing unit 210 serves as an interface with the higher layer 202, and performs processing in the LLC layer. For example, in a case where data is input from the higher layer 202 to the wireless unit 201, the LLC processing unit 210 adds a DSAP header, an SSAP header, and the like to the data, and thus, generates an LLC packet. The LLC processing unit 210 sends the LLC packet to the MAC processing unit 220. Also, when receiving an LLC packet from the MAC processing unit 220, the LLC processing unit 210 extracts data from the LLC packet, and sends the extracted data to the higher layer 202.

The MAC processing unit 220 performs processing in the MAC layer. In the example illustrated in FIG. 5, the MAC processing unit 220 includes a data processing unit 221 and a MAC frame processing unit 222. The MAC frame processing unit 222 is also called a carrier sensing control unit. The data processing unit 221 and the MAC frame processing unit 222 perform operations similar to those of the data processing unit 121 and the MAC frame processing unit 122, respectively.

When receiving an LLC packet from the LLC processing unit 210, the data processing unit 221 generates a MAC frame by attaching a MAC header including the transmission destination address, the transmission source address, the TID, and the like, and an error detection code to the LLC packet. The data processing unit 221 transmits the MAC frame to MAC frame processing unit 222. Further, when receiving a MAC frame from the PHY processing unit 230, the data processing unit 221 demodulates the MAC frame, to obtain a MAC header and an LLC packet. In a case where the transmission destination address included in the MAC header indicates its own station (specifically, the terminal 20), the data processing unit 221 sends the LLC packet to the LLC processing unit 210.

The MAC frame processing unit 222 receives a MAC frame from the data processing unit 221, and temporarily stores the MAC frame. The MAC frame processing unit 222 then performs carrier sensing over a random time, and sends the MAC frame to the PHY processing unit 230 after confirming that the channel is idle.

The PHY processing unit 230 performs processing in the PHY layer. In the example illustrated in FIG. 5, the PHY processing unit 230 includes a transmission unit 231 and a reception unit 236.

When receiving a MAC frame from the MAC processing unit 220, the transmission unit 231 generates a wireless frame by attaching a preamble including the BSS color and the QoS color, and the like to the MAC frame. The transmission unit 231 determines the value of the BSS color based on the BSS information included in the MAC header, and determines the value of the QoS color based on the TID information included in the MAC header. The transmission unit 231 converts the wireless frame into a wireless signal, and transmits the wireless signal via the antenna.

The reception unit 236 receives a wireless signal via the antenna, and performs a demodulating operation on the received wireless signal, to obtain a wireless frame. At the time of frame reception, in a case where the BSS color included in the preamble of the wireless frame indicates its own BSS (specifically, the BSS to which the terminal 20 belongs), the reception unit 236 sends the MAC frame extracted from the wireless frame, together with the BSS color and QoS color extracted from the preamble of the wireless frame, to the MAC processing unit 220. In a case where the BSS color does not indicate its own BSS, the reception unit 236 ends the demodulating operation. Even in a case where the demodulating operation is ended, the reception unit 236 sends the BSS color and the QoS color to the MAC processing unit 220. At the time of carrier sensing, the reception unit 236 notifies the MAC processing unit 220 of the values of the BSS color and QoS color extracted from the preamble of the wireless frame.

Further, the reception unit 236 measures the RSSI of the received wireless signal. The reception unit 236 notifies the MAC processing unit 220 of the RSSI.

Figure 8:
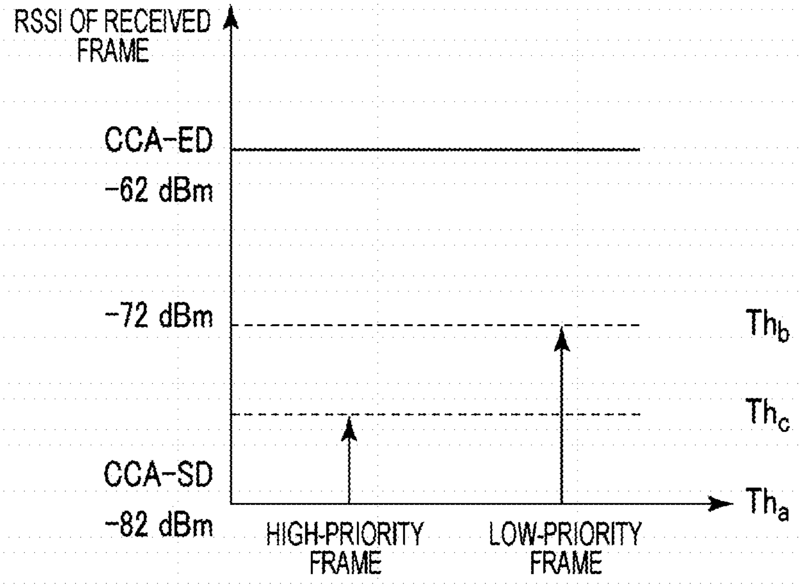
FIG. 8 is a diagram for explaining a method for determining a CCA threshold in a MAC frame processing unit illustrated in FIG. 5.

Next, the method for determining the CCA threshold is described with reference to FIG. 8. Although the description concerns the base station 10 herein, the same method can be applied to the terminal 20. In FIG. 8, −62 dBm, which accompanies CCA-ED (Energy Detection), is the CCA threshold to be used in a case where it is not recognized that the signal detected by carrier sensing is a frame being based on the IEEE 802.11 standard.

The MAC frame processing unit 122 of the base station 10 determines the CCA threshold based on the value of the BSS color and the value of the QoS color included in the preamble of the wireless frame.

In a case where the BSS color indicates the BSS to which the base station 10 belongs, the MAC frame processing unit 122 sets the CCA threshold to $Th_a$. $Th_a$ is −82 dBm, for example. $Th_a$ may be lower than −82 dBm. Note that −82 dBm, which accompanies CCA-SD (Signal Detection) shown in FIG. 8, is the default CCA threshold to be used in a case where it is recognized that the signal detected by carrier sensing is a frame being based on the IEEE 802.11 standard.

In a case where the BSS color does not indicate the BSS to which the base station 10 belongs, the MAC frame processing unit 122 determines the CCA threshold based on the value of the QoS color.

Here, the frame priority level is expressed in two stages, the QoS color "0" indicates that the frame priority level is high, and the QoS color "1" indicates that the frame priority level is low.

In a case where the value of the QoS color is "1", or where the QoS color indicates a low frame priority level, the MAC frame processing unit 122 sets the CCA threshold to $Th_b$. Here, $Th_b$ is greater than $Th_a$ ($Th_a<Th_b$). Typically, $Th_b$ is smaller than −62 dBm. $Th_b$ is −72 dBm, for example. Note that $Th_b$ may be −62 dBm or greater.

In a case where the value of the QoS color is "0", or where the QoS color indicates a high frame priority level, the MAC frame processing unit 122 sets the CCA threshold to $Th_c$. Here, $Th_c$ is smaller than $Th_b$ ($Th_c<Th_b$). Typically, $Th_c$ is greater than $Th_a$. $Th_c$ is −77 dBm, for example. Note that $Th_c$ may be equal to or smaller than $Th_a$.

The method for setting the CCA threshold in a case where the frame priority level is expressed in four stages is now briefly described.

In a case where the QoS color indicates the lowest frame priority level, the MAC frame processing unit 122 sets the CCA threshold to $Th_b$. Here, $Th_b$ is higher than $Th_a$ ($Th_a<Th_b$). In a case where the QoS color indicates the third highest frame priority level, the MAC frame processing unit 122 sets the CCA threshold to $Th_c$. Here, $Th_c$ is lower than $Th_b$ ($Th_c<Th_b$). In a case where the QoS color indicates the second highest frame priority level, the MAC frame processing unit 122 sets the CCA threshold to $Th_d$. Here, $Th_d$ is lower than $Th_c$ ($Th_d<Th_c$). In a case where the QoS color indicates the highest frame priority level, the MAC frame processing unit 122 sets the CCA threshold to $Th_e$. Here, $Th_e$ is lower than $Th_d$ ($Th_e<Th_d$). In an example, $Th_b$ is −72.0 dBm, $Th_c$ is −74.5 dBm, $Th_d$ is −77.0 dBm, and $Th_e$ is −79.5 dBm.

[Operation]

Next, an operation of the communication system 50 is described.

Figure 9:
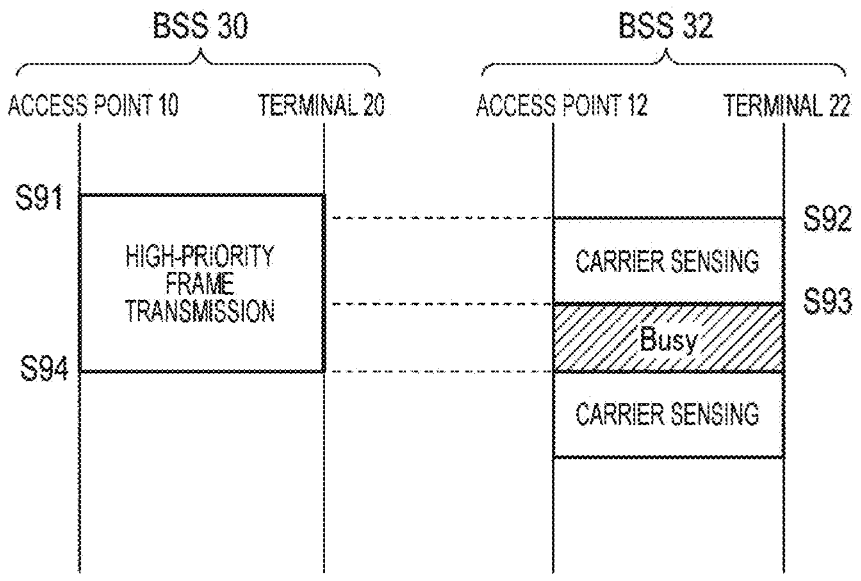
FIG. 9 is a timing chart illustrating an operation of the communication system illustrated in FIG. 1.

FIG. 9 schematically illustrates an example operation of the communication system 50. As described above in relation to FIG. 1, the BSS 30 includes the base station 10 and the terminal 20, and the BSS 32 includes the base station 12 and the terminal 22. The example illustrated in FIG. 9 is an assumed situation in which a request for frame transmission to the terminal 22 is generated in the base station 12 when the base station 10 is transmitting a high-priority frame to the terminal 20. Further, the received power of the frame to be received by the base station 12 from the base station 10 is in the range from $Th_c$ to $Th_b$.

In step S91 in FIG. 9, the base station 10 starts transmitting a high-priority frame to the terminal 20.

In step S92, a request for frame transmission to the terminal 22 is generated in the base station 12, and the base station 12 performs carrier sensing based on CSMA/CA. The base station 12 detects the frame from the base station 10 to the terminal 20 by the carrier sensing, identifies the BSS color and the QoS color included in the preamble of the detected frame, and recognizes that the destination of the detected frame is not a wireless station in the BSS 32, and that the detected frame is a high-priority frame. Accordingly, the base station 12 sets the CCA threshold to $Th_c$. In step S93, the base station 12 recognizes that the received power of the detected frame is higher than the CCA threshold, determines that the channel is busy, and stands by.

In step S94, the base station 10 ends the transmission of the high-priority frame to the terminal 20. The base station 12 recognizes that the channel has shifted from a busy state to an idle state, and performs carrier sensing over a period of time including an IFS and a random time called a back-off time after the recognition. When determining that the channel is idle, the base station 12 starts transmitting a frame to the terminal 22.

Figure 10:
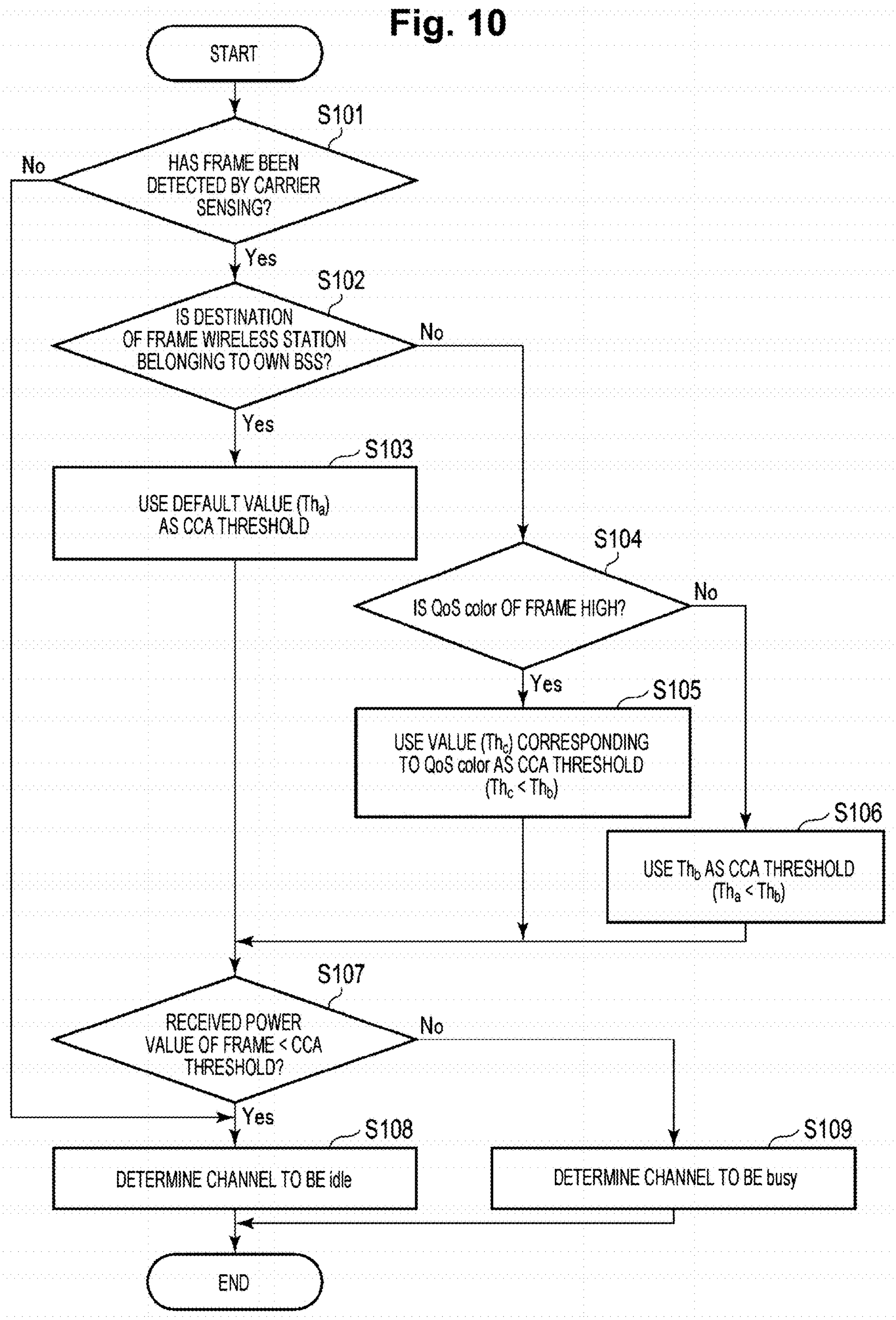
FIG. 10 is a flowchart illustrating an operation of the base station illustrated in FIG. 5.

FIG. 10 schematically illustrates an example of the procedures in a determination process to be performed by the base station 10. The MAC frame processing unit 122 of the base station 10 performs carrier sensing based on CSMA/CA before frame transmission. For example, the MAC frame processing unit 122 starts carrier sensing in response to receipt of a MAC frame from the data processing unit 121.

If any frame is not detected in the PHY processing unit 130 by the carrier sensing (step S101; No), the process moves on to step S108. In step S108, the MAC frame processing unit 122 determines that the channel is idle, and moves on to a frame transmitting operation.

If a frame is detected in the PHY processing unit 130 by the carrier sensing (step S101; Yes), the process moves on to step S102. In step S102, the MAC frame processing unit 122 determines whether the destination of the received frame that is the detected frame is the wireless station belonging to its own BSS. For example, the reception unit 136 extracts the BSS color from the preamble of the received frame by demodulating the preamble of the received frame, and the MAC frame processing unit 122 determines whether the BSS color extracted by the reception unit 136 matches the BSS color of its own BSS.

If the destination of the received frame is a wireless station belonging to its own BSS (step S102; Yes), the process moves on to step S103. In step S103, the MAC frame processing unit 122 determines to use the default value. $Th_a$ as the CCA threshold.

If the destination of the received frame is not a wireless station belonging to its own BSS (step S102; No), the process moves on to step S104. In step S104, MAC frame processing unit 122 determines whether the priority level of the received frame is high. For example, the reception unit 136 extracts the QoS color from the preamble of the received frame by demodulating the preamble of the received frame, and the MAC frame processing unit 122 determines whether the QoS color extracted by the reception unit 136 is "0" or is "1".

If the priority level of the received frame is not high (step S104; No), the MAC frame processing unit 122 in step S106 determines to use a designated value $Th_b$ as the CCA threshold. Here, $Th_b$ is greater than $Th_a$ ($Th_a<Th_b$). If the priority level of the received frame is high (step S104; Yes), the base station 10 in step S105 determines to use a value $Th_c$ corresponding to the priority level as the CCA threshold. Here, $Th_c$ is smaller than $Th_b$ ($Th_c<Th_b$).

After the CCA threshold is set in step S103, S105, or S106, the process moves on to step S107. In step S107, the MAC frame processing unit 122 compares the power value of the received frame with the CCA threshold. If the power value of the received frame is smaller than the CCA threshold (step S107; Yes), the process moves on to step S108. In step S108, the MAC frame processing unit 122 determines that the channel is idle, and moves on to a frame transmitting operation.

If the power value of the received frame is equal to or greater than the CCA threshold (step S107; No), the process moves on to step S109. In step S109, the MAC frame processing unit 122 determines that the channel is busy, and does not move on to a frame transmitting operation.

Advantageous Effects

In the embodiment described above, a wireless station performs carrier sensing based on CSMA/CA before frame transmission. The wireless station obtains the BSS color and the QoS color from the preamble of a received frame that is a frame detected by the carrier sensing, and determines the CCA threshold based on the BSS color and the QoS color. The wireless station determines whether the received frame is a frame related to its own BSS, based on the BSS color. In a case where the received frame is a frame related to its own BSS, the wireless station sets the CCA threshold to the default value $Th_a$. In a case where the received frame is a frame related to another BSS, the wireless station determines whether the priority level of the received frame is high, based on the QoS color. In a case where the priority level of the received frame is low, the wireless station sets the threshold to $Th_b$, which is greater than $Th_a$. In a case where the priority level of the received frame is high, the wireless station sets the threshold to $Th_c$, which is smaller than $Th_b$. The wireless station determines the channel usage state based on a comparison between the received power of the received frame and the CCA threshold.

In a case where the received frame is a low-priority frame related to another BSS, the CCA threshold is set to a greater value than that in a case where the received frame is a frame related to its own BSS. Thus, the exposed node problem can be avoided or reduced. Further, in a case where the received frame is a high-priority frame related to another BSS, the CCA threshold is set to a smaller value than that in a case where the received frame is a low-priority frame related to another BSS. In a case where the received frame is a high-priority frame related to another BSS, it is difficult to determine that the channel is idle, and events in which the high-priority frame is interfered are reduced. This makes it possible to ensure the low latency required for a high-priority frame in another BSS. In this manner, a high-priority frame related to another BSS is protected. Thus, even in a situation where there is an overlap in a plurality of BSSs, highly-reliable wireless communication is provided.

Since the QoS color is included in the preamble of a frame, it is possible to detect, at an early stage, whether the received frame is a high-priority frame. In the determination of a channel usage state, a demodulating operation on the received frame can be terminated halfway, and the hardware resources can be saved.

$Th_c$ may be a value equal to or smaller than $Th_a$. In this case, high-priority frames related to other BSSs are more strongly protected.

[Modifications]

In the embodiment described above, the QoS color is included in the preamble of a wireless frame. Alternatively, the QoS color may be included in some other portion of a wireless frame, such as the MAC header, for example.

The wireless unit of a wireless station (the wireless unit 101 of the base station 10 or the wireless unit 201 of the terminal 20, for example) may be embodied by an individual component such as a chip. For example, a chip may be incorporated into the substrate of a wireless station at the time of manufacture of the wireless station. The wireless apparatus mentioned herein may refer to a wireless station, or may refer to an individual component that forms the wireless unit of a wireless station.

Note that the present invention is not limited to the embodiments described above, and various modifications can be made to them in the implementation stage without departing from the scope of the invention. The embodiments may be combined appropriately. In that case, combined advantageous effects can be obtained. Further, the embodiments described above include various inventions, and various inventions can be extracted in combinations selected from a plurality of disclosed components. For example, in a case where the problems can be solved, and the advantageous effects can be obtained despite elimination of some components from all the components described in the embodiments, a configuration from which the components are eliminated can be extracted as an invention.

REFERENCE SIGNS LIST

10, 12 Base station
20, 22 Terminal
30, 32 BSS
40 Network
50 Communication system
60 Wireless frame
61 PHY preamble
62 PHY header
63 MPDU
101, 201 Wireless unit
102, 202 Higher layer
110, 210 LLC processing unit
120, 220 MAC processing unit
121, 221 Data processing unit
122, 222 MAC frame processing unit
130, 230 PHY processing unit
131, 231 Transmission unit
132 PHY header processing unit
133 Wireless signal processing unit
136, 236 Reception unit
137 Wireless signal processing unit
138 PHY header processing unit
151, 251 CPU
152, 252 ROM
153, 253 RAM
154, 254 Wireless communication module
155 Wire communication module
255 Display
256 Storage

The invention claimed is:

1. A wireless apparatus comprising:

a wireless communication circuit configured to receive, on a frequency channel, a frame including first identification information for identifying a priority level of the frame and second identification information for identifying a basic service set (BSS); and processing circuitry configured to determine a threshold based on the first identification information and the second identification information included in the received frame, and determine a usage state of the frequency channel based on a comparison between received power of the frame and the determined threshold, wherein the wireless apparatus belongs to a first BSS, and the determining the threshold comprises:

setting the threshold to a first value, when the second identification information indicates a second BSS different from the first BSS, and the first identification information indicates a first priority level;

setting the threshold to a second value greater than the first value, when the second identification information indicates the second BSS, and the first identification information indicates a second priority level lower than the first priority level; and setting the threshold to a third value smaller than the second value when the second identification information indicates the first BSS.

2. The wireless apparatus according to claim 1, wherein the first value is not greater than the third value.

3. A wireless communication method performed by a wireless apparatus, the wireless communication method comprising:

receiving, on a frequency channel, a frame including first identification information for identifying a priority level of the frame and second identification information for identifying a basic service set (BSS);

determining a threshold based on the first identification information and the second identification information included in the received frame; and determining a usage state of the frequency channel based on a comparison between received power of the frame and the determined threshold, wherein the wireless apparatus belongs to a first BSS, and the determining the threshold comprises:

setting the threshold to a first value, when the second identification information indicates a second BSS different from the first BSS, and the first identification information indicates a first priority level:

setting the threshold to a second value greater than the first value, when the second identification information indicates the second BSS, and the first identification information indicates a second priority level lower than the first priority level; and setting the threshold to a third value smaller than the second value when the second identification information indicates the first BSS.

4. The wireless apparatus according to claim 1, wherein when the second identification information indicates the first BSS, the threshold is set to the third value regardless of the first identification information included in the received frame.

* * * * *